Dec. 29, 1964   W. W. BUCHMAN   3,163,799
EXPLODING SQUIRTED WIRE PULSED LIGHT SOURCE
Filed April 26, 1962
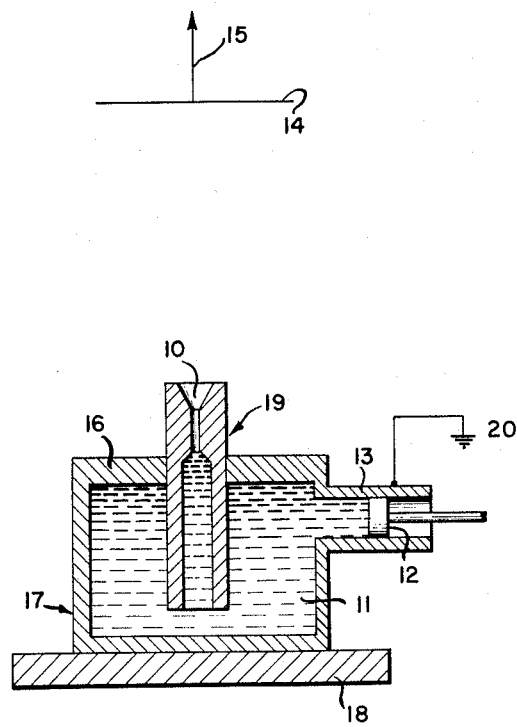
William W. Buchman,
INVENTOR.
BY.
John M. Koch
ATTORNEY.

3,163,799
EXPLODING SQUIRTED WIRE PULSED LIGHT SOURCE
William W. Buchman, Los Angeles, Calif., assignor to Hughes Aircraft Company, Culver City, Calif., a corporation of Delaware
Filed Apr. 26, 1962, Ser. No. 190,491
2 Claims. (Cl. 314—22)

This invention relates to an apparatus for producing pulses of intense light, such as the type used to pump an optical maser or laser to the threshold for stimulated emission of coherent light from a body of laser material, high speed photography, etc., and particularly to an exploding wire type of pumping light source.

The exploding-wire light source is one of the most brillant light sources known. It is capable of producing extremely high energy inputs when applied to pumping lasers, for example. It gives high-peak power levels and extremely fast rise times. These are important factors in designing high-power pulsed lasers for operations where short pulses of very intense pumping light are required, and in supplying the light for high-speed cameras.

Efficient coupling of energy is achieved by focusing the small diameter, line source light output of the exploding wire with a polished elliptical mirror onto the body of laser material, such as a pink ruby rod. To eliminate the shock wave set up by the exploding wire at high energy levels, the laser rod is surrounded by concentric hollow cylinders of plastic and glass. These help absorb the shock, filter out extraneous radiation that isn't useful for pumping, and prevent the ruby's shattering from shock or wire fragments. To date, Nichrome, aluminum, copper and tungsten wire have been exploded from capacitor banks with an output energy capacity of about 33,600 joules.

For high-powered pulse laser operation, short bursts of very intense pumping light are needed. Since high power output is one of the most sought-for goals in laser research, exploding wire pumping appears to be one of the useful approaches for reaching it.

Among the problems encountered in applying the exploding wire pumping light source to pulse laser operation, is the problem of repeatability at extremely high rates. This entails continuously feeding increments of wire into the wire exploding means during extremely short increments of time and continuously exploding the wire without loss of a significant amount of time.

Accordingly, it is an important object of this invention to provide a method and means for continuously supplying, at extremely high rates, an increment of metal wire to an exploding zone.

Additional objects will become apparent from the following description, which is given primarily for purposes of illustration, and not limitation.

Stated in general terms, the objects of this invention are attained by providing an exploding wire light source which includes a body of liquid electrical conducting material, or molten metal, in a suitable, enclosed container provided with an orifice and activator means, such as a piston and cylinder arrangement, for example, for applying a pressure pulse upon the body of molten metal so that a jet or stream of the liquid conductor is formed outside the orifice. The jet of liquid conductor is ejected into exploding-wire means, such as a capacitor, for example, adapted to explode the jet or stream of liquid conductor and produce a pulse of very intense light.

A more detailed description of a specific embodiment of the invention, as applied to pumping a pink ruby laser, is given below with reference to the appended drawing, wherein is given schematically a vertical sectional view showing a body of molten metal in a heated container provided with an orifice and a pressure actuator, adjacent a capacitor.

The device shown includes an orifice 10 formed in the outer end of a nozzle or jet 19. The inner end of nozzle 19 is submerged in a body of liquid conductor, such as molten metal 11, enclosed pressure-tight in a container 17. Container 17 is made of a suitable electrical conducting material, such as a high melting point metal. A cylinder 13, with a piston 12 fitted therein, is attached to, or made integral with, the container 17 to exert pressure upon liquid metal 11, enclosed in the container. A suitable heater 18, such as an electrical heater, is employed to maintain liquid metal 11 molten, in cases where that is necessary.

In operation, a jet of molten metal, such as Wood's metal, tin lead, bismuth mercury, sodium, etc., alloys of such metals, molten salts, or other suitable liquid electrical conducting material, is squirted in a fine stream through the orifice 10, by the application of a pressure pulse to liquid 11 through piston and cylinder arrangement 12, 13. Molten salts and conducting solutions can be used with different degrees of effectiveness. High temperatures require the use of materials that can withstand them. Reactive metals such as sodium require other precautions; such as perhaps requiring operation in a vacuum. Operation in a vacuum has the advantage of passing ultraviolet radiation. A liquid such as mercury breaks up into fine droplets, but even so the reduction of electrical resistance in the stream of droplets directs the explosion. In some cases, such as mercury, the toxicity of the explosion products require the addition of suitable means to confine the products. An advantage of a material like mercury squirted in a vacuum is that it collects on the walls and flows back into a collecting reservoir (not shown) for reuse.

The jet of metal, or other conducting liquid, produced as described in the paragraph above, is directed at an electrode 14, connected through a conductor 15, to the ungrounded side of a charged capacitor bank (not shown). The grounded side of the capacitor bank, which is the top of the container 17, forms the other electrode 16. The electrode 16 is grounded, as indicated at 20, and is connected to the conducting liquid 11 through enclosed conducting container 17. Liquid 11 is maintained in a molten state by an electric heater 18, if necessary.

When the circuit is completed through the jet or stream of conducting liquid, an explosion of the jet, or "wire," takes place with a brilliant flash of intense light. The above sequence of steps can be carried out continuously, at an extremely rapid rate, to produce a series of rapid, short, intense light pulses which produce a corresponding series of pulses of emitted coherent light from a laser being pumped by the exploding liquid wire apparatus of this invention.

In general, the diameter of orifice 10 is made relatively small to produce a fine stream, or jet, of conducting liquid, which in turn results in a relatively high impedance squirted wire. High impedance is desirable, in general, for impedance matching to the capacitor bank.

The piston 12 can be actuated in any desired, suitable manner. For example, it can be actuated by the use of a cam, solenoid, piezoelectric crystal, hammer, hydraulically, pneumatically, or in any other suitable manner.

What is claimed is:
1. An exploding-wire light source which comprises:
 (a) a body of liquid electrical conductor;
 (b) container means for enclosing the body of liquid electrical conductor;
 (c) an orifice means immovably mounted in the container means and establishing communication between the body of liquid electrical conductor and the exterior of the container means;

(d) an activator means for applying a pressure pulse upon the body of liquid electrical conductor and forming a jet thereof by ejection of liquid conductor through the orifice means; and (e) electrical wire-exploding means for exploding the wire-jet of liquid electrical conductor.

2. An exploding-wire light source which comprises:
(a) a body of molten metal;
(b) container means for enclosing the body of molten metal;
(c) an orifice means immovably mounted in the container means and establishing communication between the body of molten metal and the exterior of the container means;
(d) an activator means for applying a pressure pulse upon the body of molten metal and forming a jet thereof by ejection of metal through the orifice means; and
(e) electrical wire-exploding means for exploding the wire-jet of molten metal.

References Cited in the file of this patent

UNITED STATES PATENTS

| | | |
|---|---|---|
| 799,451 | Coleman | Feb. 7, 1904 |
| 1,848,279 | Spagnola | Mar. 8, 1932 |
| 2,208,439 | Suits | July 16, 1940 |